United States Patent [19]
Furutani et al.

[11] Patent Number: 5,328,415
[45] Date of Patent: Jul. 12, 1994

[54] AUTOTENSIONER

[75] Inventors: Katsumi Furutani, Iwata; Ken Yamamoto, Shizuoka; Satoshi Kitano, Hamakita, all of Japan

[73] Assignee: NTN Corporation, Osaka, Japan

[21] Appl. No.: 68,548

[22] Filed: May 28, 1993

[30] Foreign Application Priority Data

May 29, 1992 [JP] Japan .................................. 4-138493
Aug. 28, 1992 [JP] Japan ............................. 4-060729[U]

[51] Int. Cl.⁵ .............................................. F16H 7/10
[52] U.S. Cl. ..................................... 474/112; 474/135
[58] Field of Search ................. 474/112, 135, 134, 133

[56]  References Cited
U.S. PATENT DOCUMENTS

| 4,634,407 | 1/1987 | Holtz | 474/112 |
| 4,808,148 | 2/1989 | Holtz | 474/112 |
| 4,886,482 | 12/1989 | Koschmieder et al. | 474/133 |
| 4,917,655 | 4/1990 | Martin | 474/135 X |
| 5,186,689 | 2/1993 | Yamamoto et al. | 474/112 |
| 5,186,690 | 2/1993 | Yamamoto | 474/117 X |
| 5,266,067 | 11/1993 | Gapco | 474/112 |

FOREIGN PATENT DOCUMENTS

| 4124627A1 | 1/1993 | Fed. Rep. of Germany . |
| 1439272 | 4/1965 | France . |
| 462044 | 5/1935 | United Kingdom . |

Primary Examiner—Ramon S. Britts
Assistant Examiner—Roger J. Schoeppel
Attorney, Agent, or Firm—Nikaido, Marmelstein, Murray & Oram

[57]  ABSTRACT

An autotensioner having a fixed shaft, a pulley support pivotally supported on the fixed shaft, a pulley rotatably supported on the pulley support and a spring for biasing the pulley support in such a direction as to apply tension to a belt. The pulley support has a cylindrical portion arranged coaxially with the fixed shaft. The fixed shaft is formed with cam surfaces at such a position that wedge-shaped spaces are defined between the cam surfaces and the cylindrical portion. The wedge-shaped spaces narrow in a direction in which the pulley support pivots to slacken the belt. Friction members are each mounted in the respective wedge-shaped spaces. They have a shape substantially complementary to the shape of the wedge-shaped spaces. A spring member is also mounted in each wedge-shaped space to bias the friction members into the narrow area of each wedge-shaped space.

7 Claims, 3 Drawing Sheets

AUTOTENSIONER

This invention relates to an autotensioner used to keep constant the tension of a belt such as a timing belt for driving camshafts of an automotive engine.

One known autotensioner is disclosed in Japanese Unexamined Utility Model Publication 1-69949.

The prior art autotensioner comprises a pivotably supported bracket and a pulley support mounted on the bracket for supporting a pulley. A bolt extends through an elongated hole formed in a bottom wall of the pulley support. A pair of friction plates are fitted on the bolt so as to sandwich the bottom plate therebetween. A compression coil spring is provided to bias one of the friction plates against the bottom plate so as to damp the pivoting motion of the pulley and reduce the vibration of the belt with the frictional resistance which acts on the contact portions between the pair of friction plates and the bottom plate. Further, a tension adjusting spring is provided to bias the bracket to press the pulley against the belt, thus keeping the tension of the belt constant.

In order to increase the vibration damping capacity of the prior art autotensioner, it is necessary to increase the biasing force of the compression coil spring as well as the friction coefficient of the frictional surfaces. In order to increase the biasing force of the compression coil spring, its outer diameter and its length have to be increased. This increases the entire size of the autotensioner. On the other hand, it is impossible to increase the friction coefficient above a certain level. Thus, if the variable load of the belt exceeds a certain level, the vibration of the pulley will increase and thus the vibration and noise of the belt will also increase.

Another problem of the prior art autotensioner is that it acts as a two-way damper, that is, the frictional resistance produced at the contact portions between the friction plates and the bottom plate when the pulley pivots in one direction is substantially the same as that when it pivots in the opposite direction. Thus, if the frictional resistance is set at a relatively large value, it becomes impossible to effectively absorb variations in tension of the belt resulting from fluctuations in the engine temperature and revolving speed. Also, no instantaneous adjustment of the belt tension is possible if the belt slackens abruptly when the engine is started in a low-temperature condition. This may result in increased noise or the skipping of gear teeth due to vibration of the belt. In contrast, if the frictional resistance is set at a relatively small value, the pulley and belt will vibrate more freely. Because of these two mutually contradictory problems, it was difficult to provide an autotensioner so that it can fulfill the functions required for an autotensioner.

It is an object of this invention to provide an autotensioner which allows the belt-tensioning pulley to follow variations in tension of the belt and thus to keep the belt tension constant and which can prevent the belt from producing noise and from skipping gear teeth.

In order to solve the above problems, according to this invention, there is provided an autotensioner comprising a fixed shaft, a pulley support supported on the fixed shaft so as to be pivotable around the fixed shaft, a pulley supported on the pulley support, a tension imparting means for pivoting the pulley support in such a direction as to impart tension to a belt, the pulley support having a cylindrical portion arranged coaxially with the fixed shaft, the fixed shaft being formed with cam surfaces at such a position that wedge-shaped spaces are defined between the cam surfaces and the cylindrical portion, the wedge-shaped spaces being narrower in a direction in which the pulley support pivots to slacken the belt, friction members each mounted in the respective wedge-shaped spaces and having a shape substantially complementary to the shape of the wedge-shaped spaces, and spring members each mounted in the respective wedge-shaped spaces for biasing the friction members into the narrower area of the each wedge-shaped space.

The pulley support may be an eccentric ring having a cylindrical outer peripheral surface on which the pulley is rotatably supported and formed with a bore for receiving the fixed shaft, the bore having an axis which is offset from the center of the cylindrical outer peripheral surface.

Also, the pulley support may be an arm-shaped member provided at one end thereof with the cylindrical portion and at the other end thereof with a shaft for rotatably supporting the pulley.

In order to obtain a stable frictional property, the cam surfaces may be arranged to extend spirally or define circular paths having their respective centers located offset from the axis of the fixed shaft so that each wedge-shaped space has a wedge angle which is substantially constant over the entire contact surface with the friction members.

Also, in order to improve the responsiveness of the friction members to the pivoting motion of the pulley support, the friction coefficient of the contact portion between each friction member and each cam surface may be determined to be lower than that of the contact portion between each friction member and the cylindrical portion.

With this arrangement, when the belt tension increases and the pulley is pushed by the belt in such a direction that the pulley support is biased to pivot away from the belt, the friction members, kept in contact with the cylindrical portion, are pushed into the narrow areas of the wedge-shaped spaces. As a result, the frictional force between the friction members and the cylindrical portion increases, thereby restraining the pulley support from pivoting in the belt-slackening direction.

In contrast, when the belt slackens and the pulley support is biased to pivot in such a direction as to push the belt, the friction members, kept in contact with the cylindrical portion, are pushed toward the wider areas of the wedge-shaped spaces, allowing the pulley support to pivot quickly in the belt-tensioning direction. Thus, the tension of the belt can be kept constant.

The autotensioner according to this invention is characterized in that the pulley support encounters frictional resistance having directional properties when it pivots. With this arrangement, the pulley can follow properly fluctuations in tension of the belt and the vibration of the pulley and belt is kept minimum. The belt tension is thus kept constant and its life is long.

Also, this arrangement can quickly eliminate any slackened state of the belt when the engine is started in a cold environment, prevent the belt from skipping gear teeth and reduce the belt noise.

Further, since the wedge angle of the wedge-shaped spaces is constant over the entire circumference thereof, a stable frictional property can be obtained. Even if the frictional surfaces are worn slightly, the surface pressure on the friction members can be maintained at the original level because the spring members push the friction members. Thus, the autotensioner as a whole is durable and reliable. Also, since it is made up of a smaller number of parts, it is compact in size, light in weight and low-cost.

Other features and objects of the present invention will become apparent from the following description taken with reference to the accompanying drawings, in which.

Figure 1:
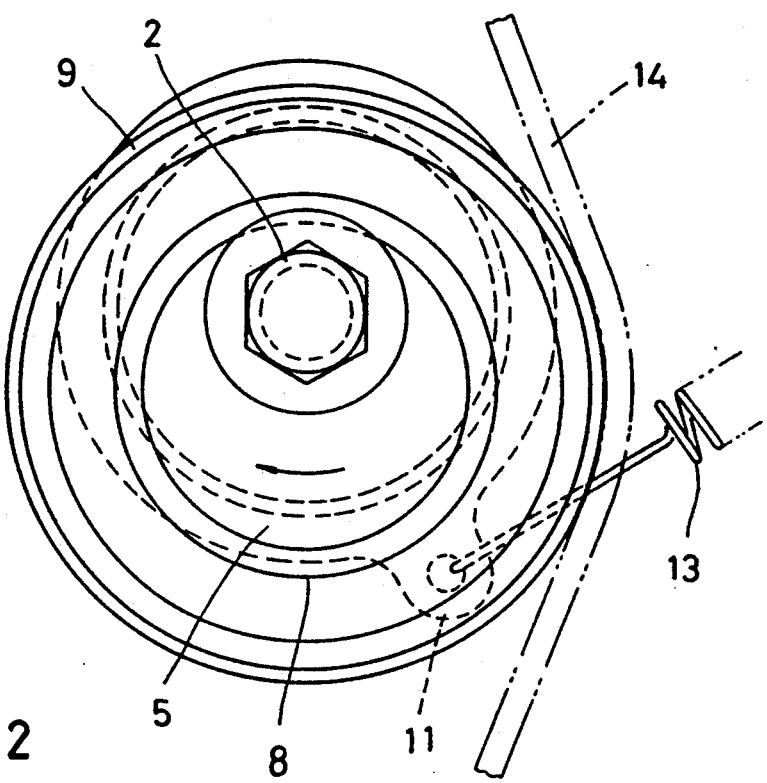
FIG. 1 is a front view of a first embodiment of the autotensioner according to this invention.
Figure 2:
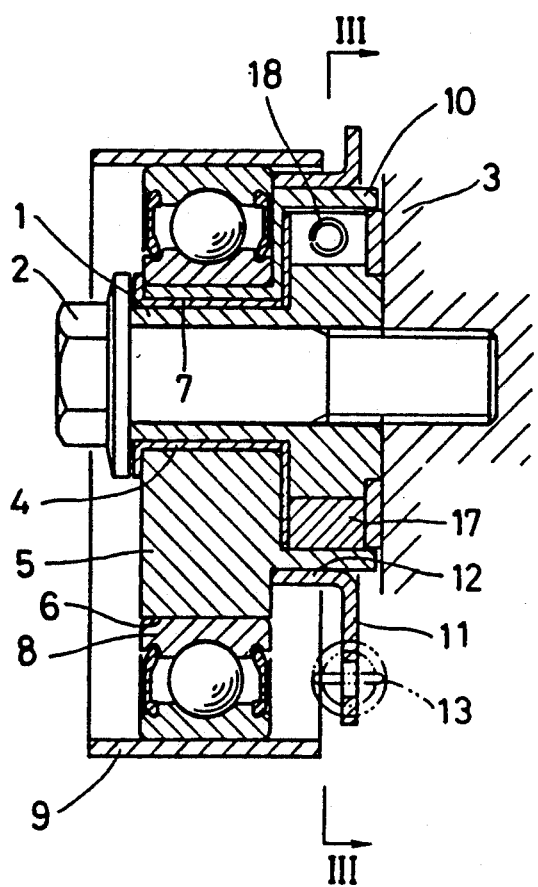
FIG. 2 is a vertical sectional side view of the same.
Figure 3:
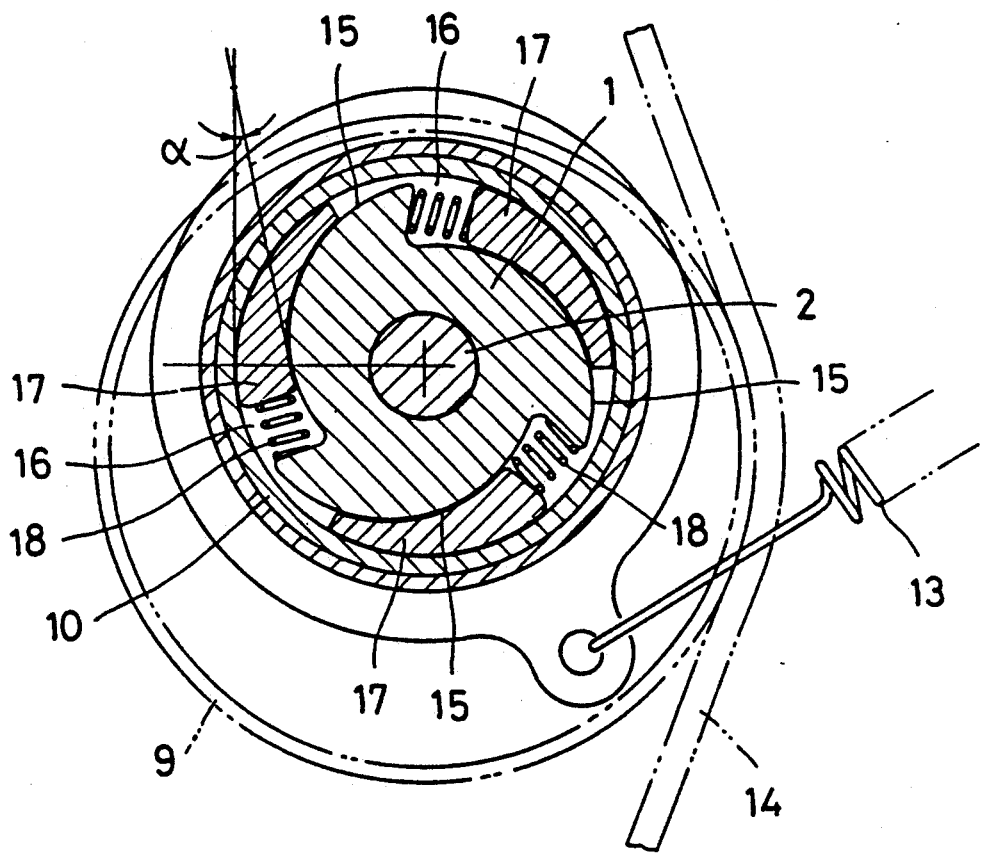
FIG. 3 is a sectional view taken along line of FIG. 2.

FIGS. 1-3 show the autotensioner according to this invention used for adjusting the tension of a camshaft driving belt of an automotive engine. As shown in the figures, a fixed shaft 1 is fixed to an engine block 3 by tightening a bolt 2.

A slide bearing 4 is mounted on the fixed shaft 1. On the slide bearing 4 is mounted a pulley support 5 in the form of an eccentric ring having a shaft receiving hole 7 which is offset from the center of its cylindrical outer surface 6. A pulley 9 is rotatably mounted around the cylindrical outer surface 6 of the pulley support 5 through a bearing 8.

The pulley support 5 has a cylindrical portion 10 arranged concentrically with respect to the fixed shaft 1. On the outer peripheral surface of the cylindrical portion 10 is press-fitted a cylindrical portion 12 provided at one end of an arm 11. A tension adjusting spring 13 is provided at the other end of the arm 11 to bias the pulley support 5 in such a direction that the pulley 9 is pressed against a belt 14.

The fixed shaft 1 has a plurality of cam surfaces 15 formed, angularly spaced apart at predetermined intervals, on the outer periphery thereof at its portion located inside the cylindrical portion 10 of the pulley support 5. A wedge-shaped space 16 is defined between each cam surface 15 and the inner peripheral surface of the cylindrical portion 10.

The wedge-shaped spaces 16 have their narrow ends positioned in front with respect to the direction in which the pulley support 5 is pivoted to slacken the belt. In each wedge-shaped space 16 is mounted a friction member 17 complementary in shape to the space 16 and a spring member 18 biasing the friction member 17 toward the narrower end of the wedge-shaped space 16.

The cam surfaces 15 may extend spirally or define circular paths having their respective centers located offset from the axis of the fixed shaft 1 so that their wedge angle $\alpha$ is substantially constant over the entire circumferential contact surface with the friction members 17.

In this arrangement, when the tension of the belt 14 increases and the pulley 9 is pushed by the belt 14, the pulley support 5 is urged to turn in a belt slackening direction in the direction of arrow in FIG. 1. Thus, the friction members 17, kept in contact with the cylindrical portion 10, are pushed into the narrow side of the wedge-shaped spaces 16. This results in increased friction between the friction members 17 and the cylindrical portion 10. The pivoting motion of the pulley support 5 is thus slowed down.

The wedge angle $\alpha$ is determined so as to allow required slidal motion between the friction members 17 and the cylindrical portion 10. Thus, if the force with which the pulley 9 is pushed by the belt 14 exceeds the sum of the frictional force between the friction members 17 and the cylindrical portion 10 and the spring force of the tension adjusting spring 13, the pulley support 5 will pivot in the belt-slackening direction until they balance with each other.

On the other hand, when the tension of the belt 14 decreases, the pulley support 5 is urged to pivot in such a direction as to increase the tension of the belt by the spring force of the tension adjusting spring 13. Thus, the friction members 17, kept in contact with the cylindrical portion 10, are pushed out toward the wide area of the wedge-shaped spaces 16. Thus, the friction force between the cylindrical portion 10 and the friction members 17 decreases, allowing the pulley support 5 to pivot quickly in the belt-tensioning direction.

Thus, the pulley support 5 encounters greater resistance when it pivots in the belt-slackening direction than when it pivots in the belt-tensioning direction. In other words, this device serves as an autotensioner having what is called the one-way damping function. Namely, the vibration of the pulley 9 and the belt 14 due to fluctuations in tension of the belt 14 can be restrained effectively. If the belt tension increases or decreases excessively, the pulley 9 will pivot in either direction, thus keeping the tension of the belt 14 constant.

When the belt tension is decreasing, the pulley 9 will pivot quickly in the belt-tensioning direction until the minimum value of the tension fluctuating balances with the spring force of the tension adjusting spring 13. Thus, this device can follow tension fluctuations caused with the change in the engine speed. Also, this device can quickly eliminate any abrupt slackening of the belt when the engine is started in a cold environment.

Figure 4A:
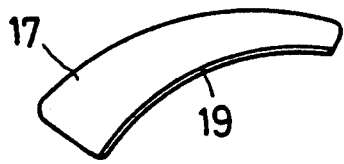
FIGS. 4A and 4B are sectional views of frictional members of other types.

FIGS. 4 show examples of the friction member 17. The friction member 17 shown in FIG. 4A has its inner surface opposite the cam surface 15 coated with a fluororesin film 19 so that its inner surface has a smaller friction coefficient than its outer surface.

Figure 4B:
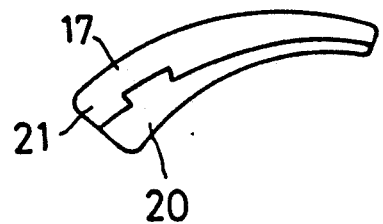

The friction member 17 shown in FIG. 4B has a double layer construction comprising an inner layer 20 and an outer layer 21. The inner layer 20 is made of an engineering plastic having a low friction coefficient. The outer layer 21 is made of an engineering plastic having a high friction coefficient.

By forming the inner and outer surfaces of the friction members 17 from materials having different friction coefficients, the friction members 17 can move quickly in the direction in which the pulley support 5 pivots. Thus, the pulley 9 can follow fluctuations in tension of the belt 14 more quickly.

As another means for providing the above-described difference in friction coefficients, the pulley support 5 may be made of a material having a higher friction coefficient than the material of which the fixed shaft 1 is made.

Also, surface treatment e.g. plating may be applied to the cam surface 15 of the fixed shaft 1 and/or the inner periphery of the cylindrical portion 10 of the pulley support 5 so that the inner periphery of the cylindrical portion 10 has a higher friction coefficient than the cam surface 15.

In order to reduce the friction coefficient of a surface, a chrome plating, a composite plating containing tetrafluoroethylene resin, or a fluorine coating may be applied. The inner surface of the cylindrical portion of the pulley support 5 may be subjected to treatment such as electroless nickel plating to provide a relatively large friction coefficient whereas the cam surface 15 on the fixed shaft 1 may be subjected to dry coating of molybdenum disulfide or composite dry coating of molybdenum disulfide and fluorine resin.

In order to provide the difference in friction coefficient, the abovesaid two means, one by using different materials and the other by surface treatment, may be combined.

Figure 5:
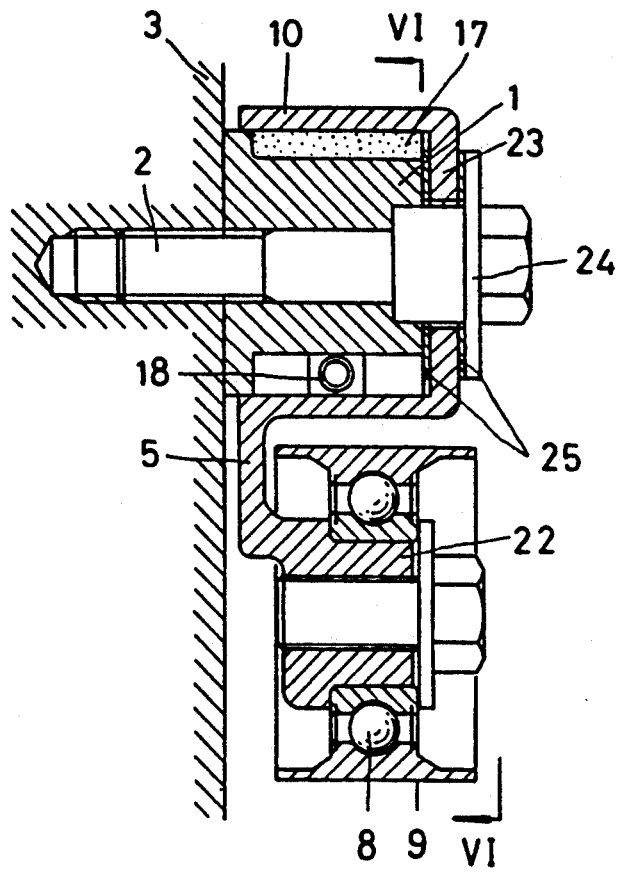
FIG. 5 is a vertical sectional side view of another embodiment.
Figure 6:
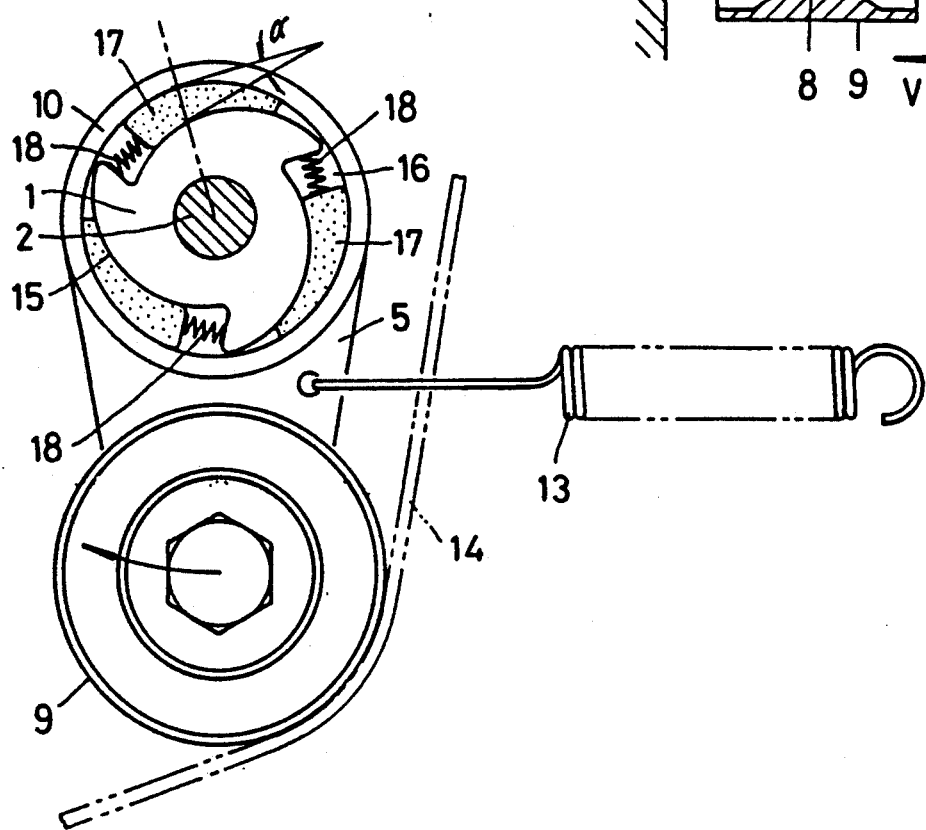
FIG. 6 is a sectional view taken along line VI—VI of FIG. 5.

FIGS. 5 and 6 show another embodiment of the autotensioner according to this invention. The pulley support 5 shown in this embodiment is in the form of an arm having the cylindrical portion 10 on one end thereof and provided on the other end thereof with a shaft 22 for supporting the pulley 9.

The cylindrical portion 10 is fitted on the fixed shaft 1. Thrust plates 25 are disposed between a flange 23 provided at one end of the cylindrical portion 10 and the end face of the fixed shaft 1 and between the flange 23 and a flange 24 of the bolt 2.

The fixed shaft 1 has a plurality of cam surfaces 15 formed on its outer peripheral surface. The wedge-shaped spaces 16 are defined between the cam surfaces 15 and the cylindrical portion 10. The friction member 17 and the spring 18 are mounted in each wedge-shaped space 16.

The pulley 9 is rotatably mounted on the shaft 22 through the bearing 8.

In this embodiment, since the pulley support 5 is arm-shaped, the pulley stroke can be large even if the outer diameter of the pulley 9 is limited. This means that belt layout can be designed more freely so that the pulley 9 can pivot following the movement of the belt 14 even if it slackens to a considerable degree.

Also, since the pulley 9 and the cylindrical portion 10 are disposed in substantially the same plane, the arm makes a freely pivoting motion under the pushing force transmitted to the pulley 9 from the belt 14. Thus, the friction members 17 will not be abraded unevenly. Also, this arrangement makes it possible to increase the axial length of the cylindrical portion 10 compared with an arrangement in which the pulley 9 and the cylindrical portion 10 are arranged coaxially with each other. Thus, friction members 17 having a larger contact surface can be used. The autotensioner thus obtained will show an excellent damping effect.

What is claimed is:

1. An autotensioner comprising a fixed shaft, a pulley support supported on said fixed shaft so as to be pivotable around said fixed shaft, a pulley supported on said pulley support, a tension imparting means for pivoting said pulley support in such a direction as to impart tension to a belt, one of said pulley support and said fixed shaft having a cylindrical portion arranged coaxially with the other, the other being formed with cam surfaces at such a position that wedge-shaped spaces are defined between said cam surfaces and said cylindrical portion, said wedge-shaped spaces being narrower in a direction in which said pulley support pivots to slacken the belt, friction members each mounted in said respective wedge-shaped spaces and having a shape substantially complementary to the shape of said wedge-shaped spaces, and spring members each mounted in said respective wedge-shaped spaces for biasing said friction members into the narrower area of said each wedge-shaped space.

2. An autotensioner as claimed in claim 1 wherein said pulley support has a cylindrical portion arranged coaxially with said fixed shaft and said fixed shaft is formed with cam surfaces.

3. An autotensioner as claimed in claim 1 or 2 wherein said pulley support is an eccentric ring having a cylindrical outer peripheral surface on which said pulley is rotatably supported and formed with a bore for receiving said fixed shaft, said bore having an axis which is offset from the center of said cylindrical outer peripheral surface.

4. An autotensioner as claimed in claim 1 or 2 wherein said pulley support is an arm-shaped member provided at one end thereof with said cylindrical portion and at the other end thereof with a shaft for rotatably supporting said pulley.

5. An autotensioner as claimed in claim 1 or 2 wherein said cam surfaces extend spirally or define circular paths having their respective centers located offset from the axis of said fixed shaft.

6. An autotensioner as claimed in claim 1 or 2 wherein said each wedge-shaped space has a wedge angle which is substantially constant over the entire contact surface with said friction members.

7. An autotensioner as claimed in claim 1 or 2 wherein the friction coefficient at the contact portion between said each friction member and said each cam surface is lower than that at the contact portion between said each friction member and said cylindrical portion.

* * * * *